(12) United States Patent
Yamakado

(10) Patent No.: US 7,690,118 B2
(45) Date of Patent: Apr. 6, 2010

(54) BAR STEEL CUTTING TOOL

(75) Inventor: Akihiro Yamakado, Tsu (JP)

(73) Assignee: MCC Corporation, Tsu-Shi (JP)

( * ) Notice: Subject to any disclaimer, the term of this patent is extended or adjusted under 35 U.S.C. 154(b) by 705 days.

(21) Appl. No.: 11/581,768

(22) Filed: Oct. 16, 2006

(65) Prior Publication Data
US 2008/0022531 A1 Jan. 31, 2008

(30) Foreign Application Priority Data
Jul. 28, 2006 (JP) ............... 2006-205970

(51) Int. Cl.
*B26D 3/16* (2006.01)
(52) U.S. Cl. .............. 30/92; 30/188; 30/189; 30/250; 30/251
(58) Field of Classification Search ........ 30/92, 30/188, 189, 250, 251
See application file for complete search history.

(56) References Cited

U.S. PATENT DOCUMENTS 2,385,835 A * 10/1945 Neal .................. 30/250
2,647,312 A * 8/1953 Neal .................. 30/189
4,058,893 A * 11/1977 Boyajian ............. 30/250
5,187,869 A * 2/1993 Heiss ................. 30/189
2002/0170182 A1* 11/2002 Nordlin .............. 30/251
2004/0134073 A1* 7/2004 Kochi ................ 30/92

FOREIGN PATENT DOCUMENTS

JP 45-024715 9/1970

* cited by examiner

*Primary Examiner*—Joseph J Hail, III
*Assistant Examiner*—Robert Scruggs
(74) *Attorney, Agent, or Firm*—Burr & Brown

(57) ABSTRACT

A bar steel cutting tool in which a fixed blade body and a rotary blade body that is capable of rotating around a first shaft, by operating a handle, are provided at the front end of a tool base for shearing bar steel with concave blades formed on outer peripheries of the fixed blade body and the rotary blade body. The handle is so constructed that the front end of a proximal portion of the handle thereof is supported by a second shaft at a position above the tool base and equipped with an elongated hole extending obliquely backwards from the second shaft. The rotary blade body has an arm portion extending backwards, and forms branch portions which nip both the right and left sides of the proximal portion of the handle at the rear end thereof.

4 Claims, 7 Drawing Sheets

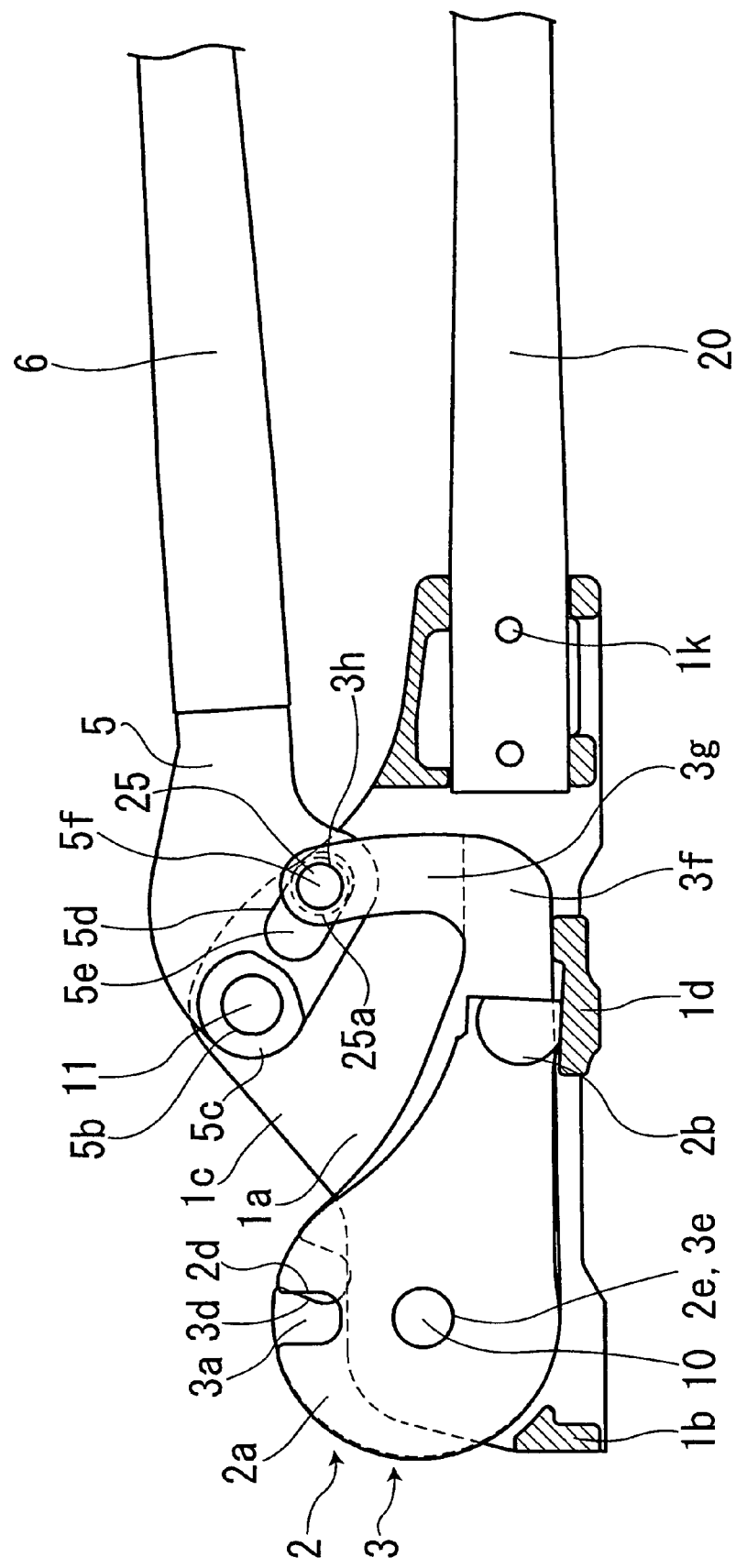

BAR STEEL CUTTING TOOL

FIELD OF INVENTION

The present invention relates to a bar steel cutting tool for cutting bar steel manually at a working site.

BACKGROUND OF THE INVENTION

As a tool for cutting bar steel to predetermined dimensions at working sites for civil engineering or construction, a bar steel cutting tool, as disclosed in Japanese Utility Model Application Publication No. 45-24715, has been known for many years. In the case of this bar steel cutting tool, bar steel is inserted into concave blades of a fixed blade body and a rotary blade body at a position at which the concave blades of both bodies meet each other, and then, a handle is pressed down so as to rotate the rotary blade body and to cut out the bar steel. An inclined elongated hole is formed in the proximal portion of the handle, and a pin provided projectingly on the rotary blade body is slidably fitted therein. When the handle is pressed down, the pin is pressed by the elongated hole so that the rotary blade body is swung downwards so as to cut out the bar steel.

In such a bar steel cutting tool, in order to execute cutting in the most effective manner the elongated hole needs to be located at the back of a handle axis and for that reason, the trajectory of the rotary blade body goes over the handle axis that is supported by a tool base. As a result, in order to avoid interference with the tool base the pin inserted into the elongated hole in the proximal portion of the handle is supported in a cantilever state by the rotary blade body. However, in this cantilever state, when a strong force is applied to the end portion of the handle, a twisting force is applied to the pin, the stability of the tool diminishes and a risk has been incurred that the tool might fall down.

One disadvantage has been that because an eccentric load always acts on various components supported in a cantilever state, a load applied for purposes of cutting escapes, cutting efficiency declines and the strength and durability of various components deteriorate.

Accordingly, an object of the present invention is to provide a bar steel cutting tool that has outstanding strength, durability, and stability, and that is capable of cutting bar steel with an excellent degree of cutting efficiency.

SUMMARY OF THE INVENTION

The present invention provides a bar steel cutting tool in which are provided at the front end of a tool base a fixed blade body, and a rotary blade body that is capable of rotating around a first shaft by operating a handle in a condition in which it is fitted to the fixed blade body; the bar steel cutting tool shears bar steel with concave blades formed on the outer peripheries of the fixed blade body and the rotary blade body; the handle is constructed in such a way that the front end of its proximal portion is supported by a second shaft at a position above the tool base and the handle is equipped with an elongated hole extending in an oblique backward direction from the second shaft; the rotary blade body forms branch portions which nip both the right and left sides of the proximal portion of the handle at the rear end of an arm portion that extends backwards; and the branch portions are bent in an upward direction so as to bypass the second shaft and support both sides of the pin that slides within the interior of the elongated hole. Because the pin is thus supported from both sides, in comparison with a conventional cantilevered structure stability at times of cutting operations is reinforced, a risk that the cutting tool may fall down is thereby removed, and the degree of physical labor demanded of workers is reduced. Furthermore, because, unlike in the case of conventional types of bar steel cutting tools, no eccentric load is applied, cutting efficiency is enhanced and the strength and durability of each component is also boosted.

Further, if the branch portions of the rotary blade body are constituted of two plates that are separated from the blade main body, if the concave blade in the rotary blade body becomes worn or damaged it becomes possible for only the blade main body of the rotary blade body to be replaced.

By adopting such a structure in which the central plane of the arm portion of the rotary blade body is located on the same vertical plane as a contact face between the fixed blade body and the rotary blade body, stability can be further enhanced.

BRIEF DESCRIPTION OF THE DRAWINGS

FIG. 7 is a side sectional view of another embodiment.

DETAILED DESCRIPTION OF THE INVENTION

Figure 1:
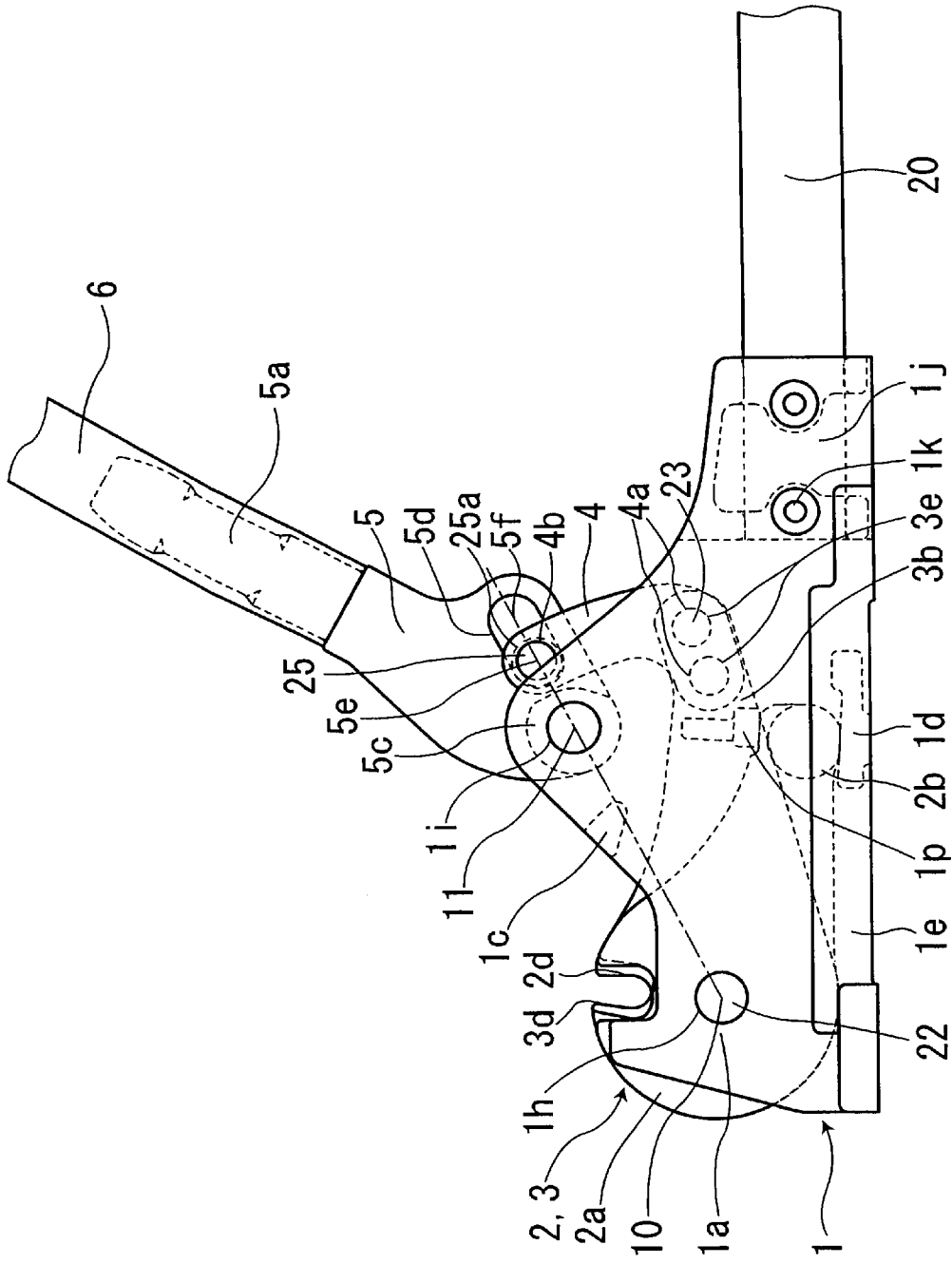
FIG. 1 is a side view of major portions of the bar steel cutting tool of the present invention.

Hereinafter, the preferred embodiments of the present invention will be described.

Reference numeral 1 denotes a tool base, a tool base 1 that has a pair of wall portions 1a disposed opposite each other. The opposing wall portions 1a are connected by connecting portions 1b, 1c, 1d that are provided perpendicularly. The bottom portion of the wall portion 1a is connected to a base portion 1e that is provided perpendicularly to the wall portion 1a. This base portion 1e has mounting holes 1f and mounting concave portions 1g for mounting the bar steel cutting tool onto the floor for purposes of stabilization. A first shaft hole 1h is formed at the front portion of the wall portion 1a so that it goes through the opposing wall portion 1a. A second shaft hole 1i is formed in an upward position behind the first shaft hole 1h at the top portion of the wall portion 1a so that it goes through the opposing wall portion 1a. A second shaft bearing portion in is provided projectingly on both of the inner sides of the second shaft hole 1i in the opposing wall portion 1a.

At the rear portion of the tool base 1 a handle installation portion 1j is formed in a depressed state so that a lower handle 20 can be installed, and the proximal portion of the lower handle 20 is fitted to the handle installation portion 1j. The lower handle 20 is then installed onto the tool base 1 by inserting a bolt into a mounting hole 1k so as to cross the handle installation portion 1j. Moreover, a member (not shown) is preferably provided at the rear end of the lower handle 20 for mounting the lower handle 20 onto the floor or the like.

Reference numeral 2 denotes a fixed blade body that is fixed to the front end of the tool base 1 and is comprised of a circular blade portion 2a and an installation portion 2b that extends backward from this blade portion 2a. The sectional shape of this fixed blade body 2 is substantially fig-like, with its top end lowered in such a way that the bottom end of the blade portion 2a and the bottom portion of the installation portion 2b are formed on a straight line. A shaft hole 2c is formed on the center axis of the blade portion 2b in such a way that it goes through the center axis. A concave blade 2d, which is dented in a U shape, is formed on the outer periphery of the top portion of the blade portion 2a. The rear end of the installation portion 2b of the fixed blade body 2 is nipped between a fixed protrusion 1p and a connecting portion 1d.

Figure 2:
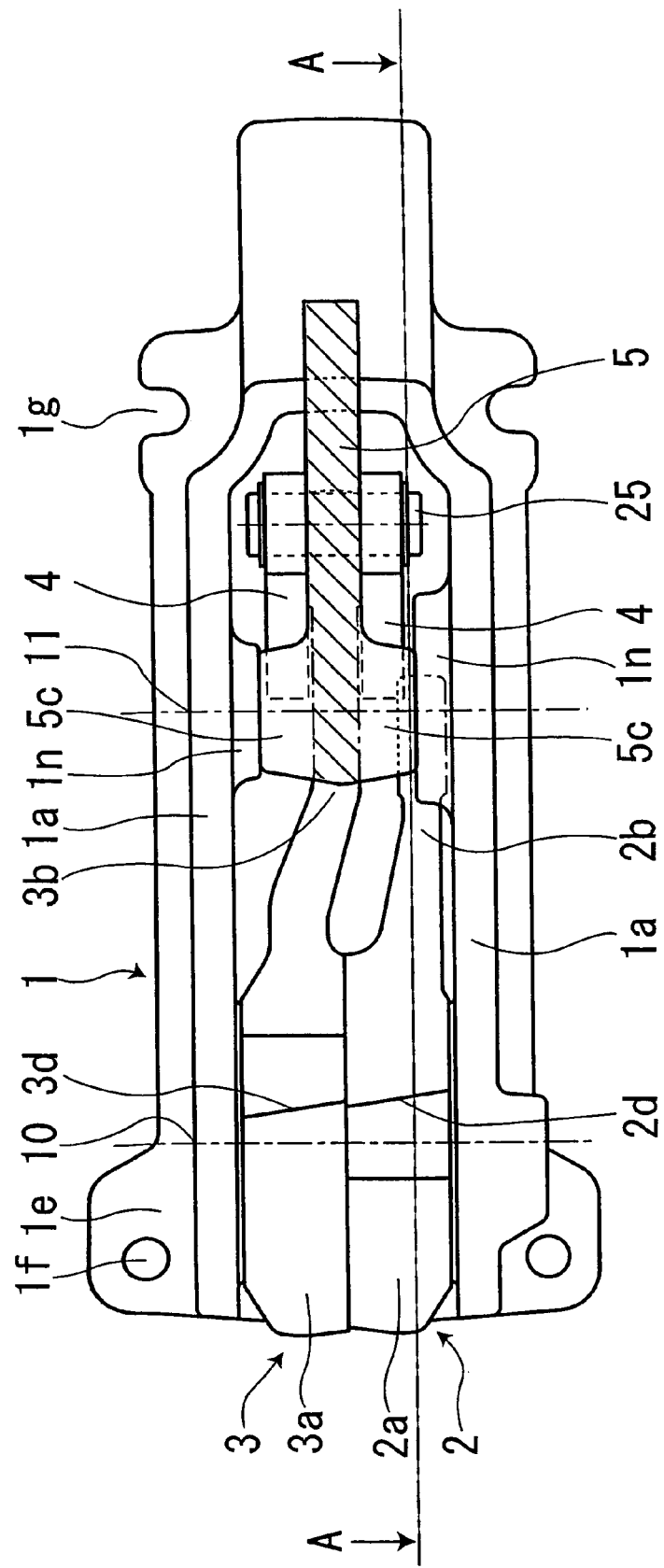
FIG. 2 is a sectional view taken along the line B-B of FIG. 2.

As shown in FIG. 2, the thickness of the installation portion 2b is less than the thickness of the blade portion 2a, and the side of the wall portion 1a of the installation portion 2b is on substantially the same plane as the side of the wall portion 1a of the blade portion 2a.

The fixed blade body 2 is supported by the wall portion 1a by means of a first shaft 10 which goes through the shaft hole 2c and the first shaft hole 1h in the tool base 1. The top portion of the installation portion 2b is pressed by a fixed protrusion 1p that projects from the wall portion 1a on one side, and the bottom portion of the installation portion 2b is pressed by the connecting portion 1d so as to inhibit the fixed blade body 2 from rotating, and to fix the fixed blade body 2 onto the tool base 1.

Reference numeral 3 denotes a rotary blade body, which is comprised of a circular blade portion 3a and an arm portion 3b that extends backward from this blade portion 3a. The sectional shape of this rotary blade body 3 is substantially fig-like with its top end lowered in such a way that the bottom end of the blade portion 3a and the bottom portion of the arm portion 3b are formed on a straight line. A shaft hole 3c is formed in the center of the blade portion 3b. A concave blade 3d which is dented in a U shape is formed on the outer periphery of the top portion of the blade portion 3a. At the rear end of the arm portion 3b of the rotary blade body 3 two nipping holes 3e, 3e are formed in parallel to one another.

The rotary blade body 3 is disposed between the wall portion 1a of the tool base 1 and the fixed blade body 2 in such a way that it overlaps the fixed blade body 2. The rotary blade body 3 is supported rotatably by the wall portion 1a, by the shaft hole 3b in the rotary blade body 3, by the shaft hole 2d in the fixed blade body 2, and by the first shaft 10 which goes through the first shaft hole 1h of the tool base 1 so as to be rotatable in relation to the fixed blade body 2.

Because, as shown in FIG. 2, the thickness of the overlapping fixed blade body 2 and the rotary blade body 3 is substantially the same as an interval between the wall portions 1a of the tool base 1, although marginally less, the wall portions 1a of the tool base 1 restrict movement in an axial direction of the fixed blade body 2 and the rotary blade body 3 and create only a minimum gap between the fixed blade body 2 and the rotary blade body 3. With this structure, the fixed blade body 2 and the rotary blade body 3 can rotate relative to each other while at the same time being attached to each other.

As shown in FIG. 2, the thickness of the arm portion 3b of the rotary blade body 3 is set to be less than the thickness of the blade portion 3a, a portion in which nipping holes 3e are made in the arm portion 3b is offset at the fixed blade body 2 and the center plane of the portion in which nipping holes 3e are made in this arm portion 3b is constructed so as to be on the same plane as a sliding face between the fixed blade body 2 and the rotary blade body 3.

Reference numeral 4 denotes two substantially L shaped plates, which are members for purposes of forming a branch portion at the rear end of the arm portion 3b of the rotary blade body 3. Nipping holes 4a are formed at the front end and at an intersection point of the plate 4, while a shaft hole 4b is formed at the other front end. Reference numeral 23 denotes a nipping shaft and its outside diameter is set at a marginally lower level of length than the inside diameters of the nipping hole 3e in the rotary blade body 3 and of the nipping hole 4a in the plate 4. Grooves, into which snap rings for a shaft are to be fitted, are formed along the entire periphery of both sides of the nipping shaft 23. The plate 4 is disposed on both sides of the arm portion 3b of the rotary blade body 3 in such a way that the shaft hole 4b is located at an upward position the intersection point portion is located on the rear side and the nipping shaft 23 is inserted into both the nipping hole 3e in the rotary blade body 3 and into the nipping hole 4a in the plate 4. The snap rings for the shaft are fitted to both sides of the nipping shaft 23 in such a way that the two plates 4 nip the arm portion 3b of the rotary blade body 3. These plates 4 are bent in an upward direction so as to avoid a second shaft 11 that will be described below.

Reference numeral 5 denotes a proximal portion of the handle and reference numeral 6 denotes the handle. The front portion of the proximal portion 5 of the handle is plate-like and a handle installation portion 5a having a substantially cylindrical section or a substantially cylindrical column section is extended a rear portion thereof in a backward direction of the tool. The handle 6 is installed on this handle installation portion 5a. A second shaft hole 5b is formed at the front end of the proximal portion 5 of the handle. A shaft portion 5c is projected in an axial direction at of both sides of the second shaft hole 5b. The width of this shaft portion 5c is set at a marginally lower level than the width of the inner side of the second shaft bearing in of the tool base 1. The proximal portion 5 of the handle is disposed inside the wall portions 1a of the tool base 1, and the second shaft 11 is inserted into the second shaft hole 1i in the wall portion 1a and into the second shaft hole 5b in the proximal portion 5 of the handle so that the proximal portion 5 of the handle is supported by the tool base 1 by means of the second shaft 11.

Figure 4:
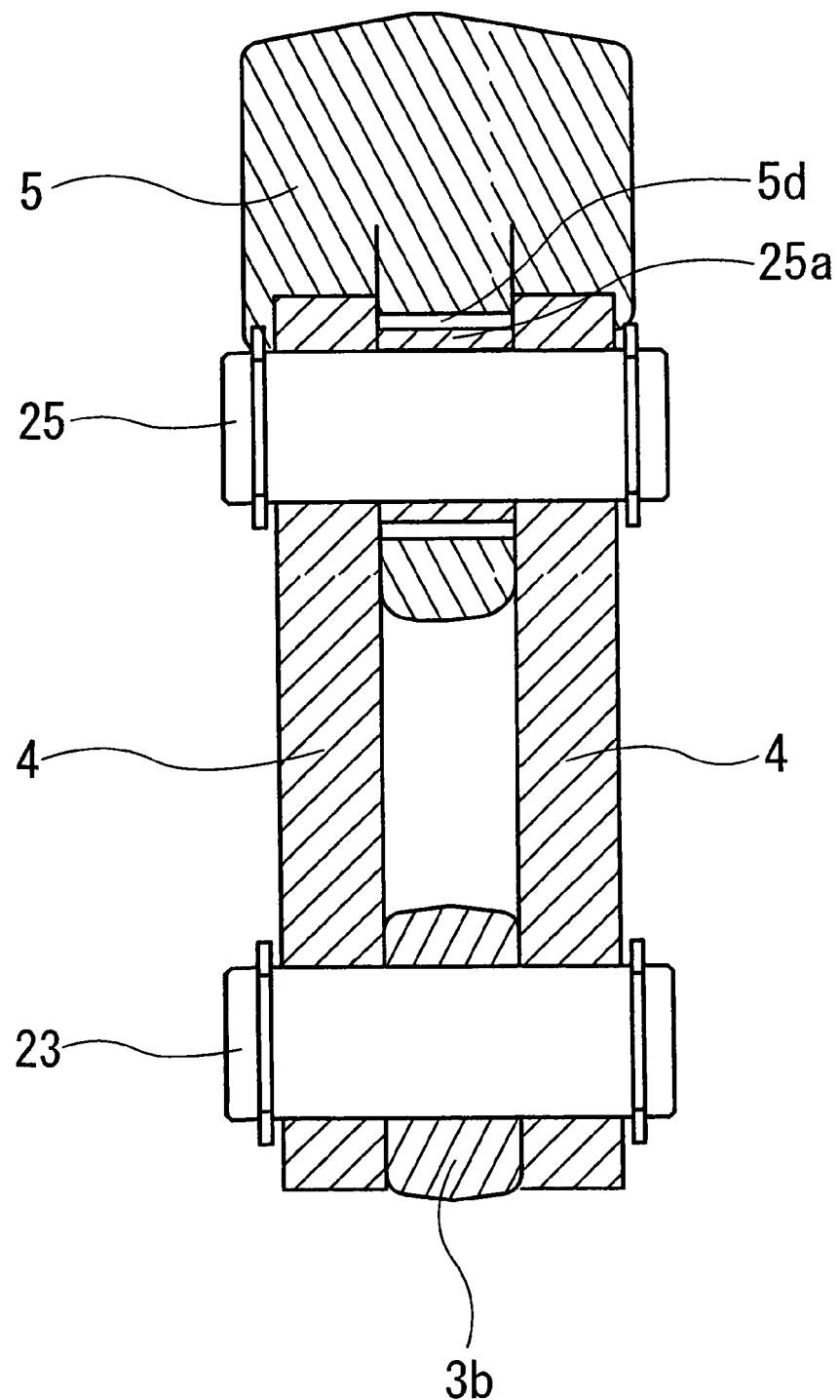
FIG. 4 is a sectional view taken along the line C-C of FIG. 3.

An elongated hole 5d is provided from a first point 5e located downwards at the back of the second shaft hole 5b in the proximal portion 5 of the handle to a second point 5f located downwards at the back of this first point 5e. The second shaft hole 5b and the first point 5e and the second point 5f of the elongated hole 5d are constructed so as to be on the same straight line. Reference numeral 25 denotes a pin, and a collar 25a is fitted onto the outer periphery of this pin 25 so that the pin slides and rotates into the elongated hole 5d. Grooves into which snap rings are to be fitted are formed along the entire periphery of both sides of the pin 25. The elongated hole 5d portion of the proximal portion 5 of the handle is nipped by the two plates 4 and the pin 25 is inserted into the elongated hole 5d and the shaft holes 4b in the plates 4. The snap rings for the shaft are fitted on to both sides of the pin 25 so as to prevent the pin 25 from falling down. With this structure, as shown in FIG. 4, the proximal portion 5 of the handle is supported by the elongated hole 5d and by the shaft holes 4 in the plates 4 in such a way that it is capable of rotating and sliding within the elongated hole 5d.

As shown in FIG. 2, the central plane of the arm portion 3b of the rotary blade body 3 is so as constructed so as to be on the same plane as the central plane of a portion nipped by the plates 4 of the proximal portion 5 of the handle.

When the handle 6 is lowered (in the fully closed state shown in FIG. 3), the concave blade 2d in the fixed blade body 2 and the concave blade 3d in the rotary blade body 3 do not make contact with each other and present a closed state. When the handle 6 is raised, the proximal portion 5 of the handle is rotated in an upward direction around the second shaft 11, so that the pin 25 and the collar 25a that is inserted into the elongated hole 5d in the proximal portion 5 of the handle rotate around the second shaft 11 so as to raise the plates 4. Consequently, the rotary blade body 3 rotates counterclockwise around the first shaft 10. With a rotation of the proximal portion 5 of the handle, the pin 25 and the collar 25a that is inserted into the shaft hole 4b in the plate 4 slide within the elongated hole 5d.

Figure 5:
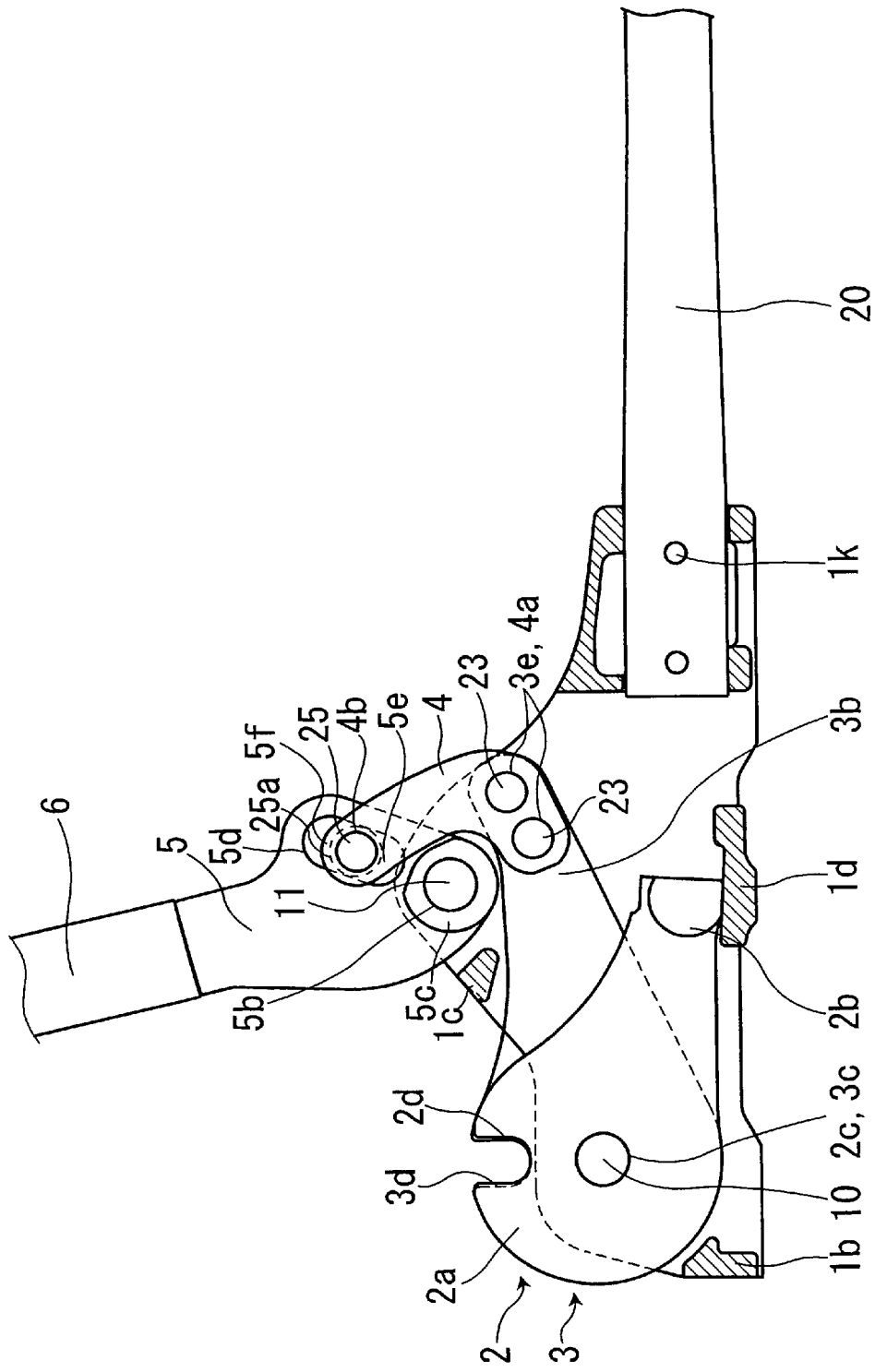
FIG. 5 is a side sectional view of the bar steel cutting tool in an open state.

When the handle 6 is raised completely, the plate 4 of the rotary blade body 3 makes contact with the shaft portion 5c of the proximal portion 5 of the handle so as to inhibit the rotary blade body 3 from rotating. A portion of the shaft portion 5c makes contact with the arm portion 2b is of a shape of anastomosis with the plate 4, without making a point contact therewith. When the handle 6 is raised and opened completely as shown in FIG. 5, the concave blade 2d of the fixed blade body 2 and the concave blade 3d of the rotary blade body 3 meet each other so as to communicate. Because the plate 4 formed at the back of the rotary blade body 3 is bent in an upward direction so as to bypass the second shaft 11, the rotary blade body 3 never interferes with the shaft portion 5c of the proximal portion 5 of the handle even in an open state, as shown in FIG. 5.

As shown in FIG. 2, the rear side of the concave blade 2d of the fixed blade body 2 is inclined in such a way that it narrows from its front side in an inward direction. The front side of the concave blade 3d of the rotary blade body 3 is inclined in such a way that it expands from its front side in an inward direction. With this structure, if bar steel is placed in the concave blades 2d, 3d and then the rotary blade body is rotated three times, the inclined portions of the concave blades 2d, 3d bite into the bar steel and cut out the bar steel by means of shearing.

Next, the operation of the bar steel cutting tool of the present invention will be described. The concave blades 2d, 3d are opened by raising the handle 6 (state shown in FIG. 5) and bar steel is inserted into the concave blades 2d, 3d. In this state, the pin 25 is located near an intermediate point between the first point 5e and the second point 5f of the elongated hole 25.

Figure 6:
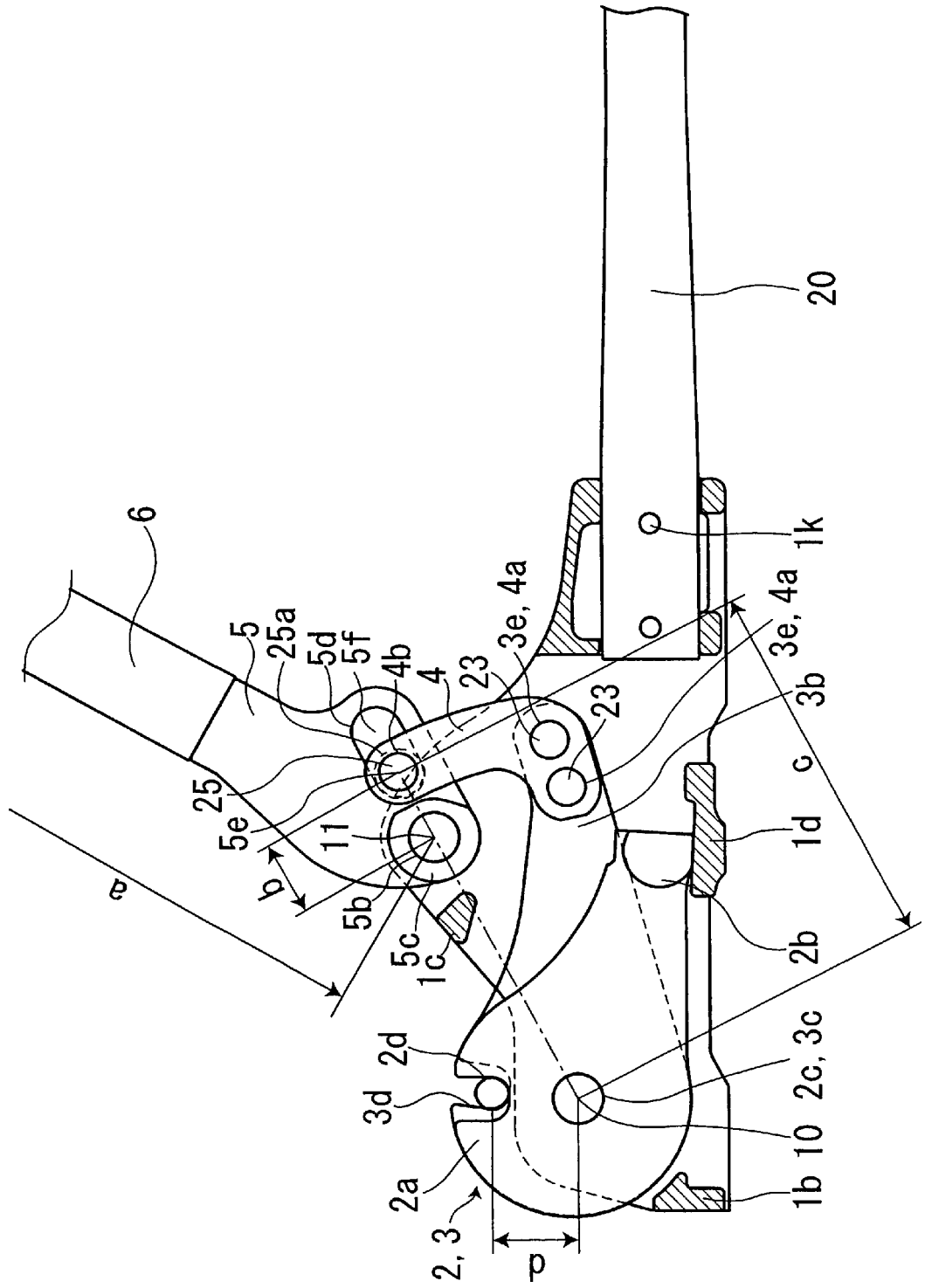
FIG. 6 is a side sectional view of the bar steel cutting tool at the time of cutting.

When the proximal portion 5 of the handle is rotated clockwise by pressing down the handle 6, the rotary blade body 3 is rotated, and when the interval between the concave blades 2d and 3d becomes equal to the diameter of the bar steel, the concave blades 2d, 3d bite the bar steel (state shown in FIG. 6). In this state, the bar steel cutting tool is preferably constructed in such a way that the first shaft 10, the second shaft 11 and the shaft hole 4b in the plate 4 are located on an identical straight line, and that the axis of the pin 25 is located at the first point 5e of the elongated hole 5d.

On the assumption that a distance between the second shaft 11 and a portion with which the handle 6 is gripped by hand as a power point is a, and that a distance from the second shaft 11 as far as the center of the pin 25 is b, according to the principle of leverage, the load pressing down on the pin 25 is a/b relative to the load pressing down on the handle 6. Further on the assumption that a distance from the first shaft 10 as far as the pin center 25 is c, and that a distance from the first shaft 10 to a point of action at which the concave blades 2d, 3d bite the bar steel is d, the load applied by the concave blades 2d, 3d onto the bar steel is, relative to the load pressing down on the pin 25, c/d.

If, as described above, the bar steel cutting tool is constructed in such a way that the first shaft 10, the second shaft 11 and the shaft hole 4b in the plate 4 are on the same straight line whenever the concave blades 2d, 3d bite the bar steel, the direction of a force applied to the pin 25, and the trajectory of the shaft hole 4b in the plate 4 rotating around the first shaft 10, are made to be equal by the elongated hole 5d in the proximal portion 5 of the handle, and by means of the elongated hole 5d in the proximal portion 5 of the handle a load acting on the pin 25 accordingly comes to be applied to the rotary blade body 3 without escaping. Therefore, in this case, a force acting on the bar steel by means of the concave blades 2d, 3d is ac/bd relative to the force pressing down on the handle 6, and it thus becomes possible for bar steel to be cut out with a modest degree of operational force. If the shaft center of the pin 25 is located at the first point 5e within the elongated hole 5d, the distance b becomes the shortest possible and at the times of cutting a maximum load can thus be applied to the bar steel.

If the handle 6 is lowered further with the concave blades 2d, 3d biting the bar steel, the pin 25 slides from the first point 5e in the direction of the second point 5f, and the distance b is thereby prolonged, thus making it possible for the rotary blade body 3 to be rotated with a smaller rotation angle of the handle 6, and thereby enhancing working efficiency. In this case, although the load acting on the bar steel decreases because distance b increases, the area of a face of the bar steel that is cut decreases as the bar steel is sheared, and because the bar steel can be sheared with a smaller load, it becomes possible for the bar steel to be cut smoothly without the need to increase an operational force for pressing down on the handle 6.

The diameter of a bar of steel to be cut by the bar steel cutting tool of the present invention can, for example, be ϕ13 mm-ϕ16 mm. The bar steel cutting tool is preferably constructed in such a way that whenever the concave blades 2d, 3d bite the bar steel the first shaft 10, the second shaft 11 and the shaft center of the pin 25 inserted into the shaft hole 4b in the plate 4 are on an identical straight line that is appropriate for the diameter of the bar steel to be cut.

Figure 3:
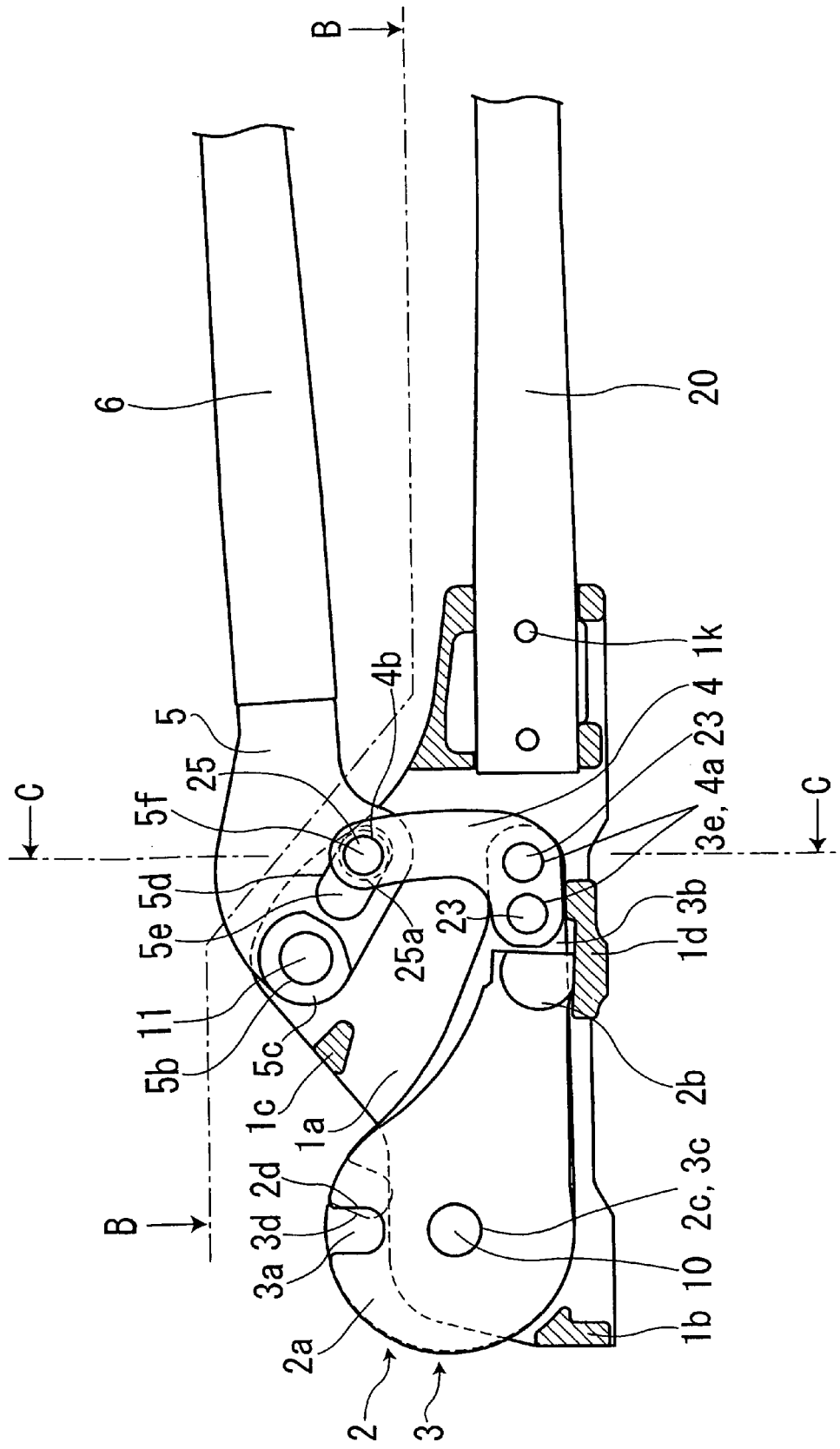
FIG. 3 is a sectional view taken along the line A-A of FIG. 2.

When the handle 6 is lowered further, the bottom portion of the arm portion 3b of the second blade portion 3 makes contact with the connecting portion 1d of the tool base 1, as shown in FIG. 3, thereby inhibiting a rotation of the handle 6. In this condition, the concave blades 2d, 3d adopt a closed state in which they do not communicate with each other, and consequently, the bar steel can be completely cut by shearing.

Because in this bar steel cutting tool, as shown in FIG. 4, the arm portion 3b of the second blade portion 3 and both sides of the proximal portion 5 of the handle are nipped by the plates 4, and the elongated hole in the proximal portion 5 of the handle is supported from both sides, no tilting force is produced at times that the bar steel is cut thereby making it possible to eliminate a danger of that the bar steel cutting tool falling down. Further, because no load escapes sideways, the bar steel can be cut efficiently with a small load. Additionally, durability of the tool is enhanced because no eccentric load is imposed on each component.

Because, as described previously, the central plane of the arm portion 3b of the rotary blade body 3 and the central plane of the portion nipped by the plates 4 of the proximal portion 5 of the handle are constructed on the same plane, and the sliding face between the fixed blade body 2 and the rotary blade body 3 and the central plane of the portion nipped by the plates 4 of the proximal portion 5 of the handle are constructed on the same plane, no load escapes, the requisite operational force is reduced and the bar steel can be cut out efficiently.

FIG. 7 shows another embodiment of the present invention. According to this embodiment, by means of the formation of grooves at the rear end of the arm portion 3b of the rotary blade portion 3 a branch portion which nips the proximal portion 5 of the handle from both the right and left sides is formed integrally with the rotary blade body 3. As in the embodiment described above, the branch portion is bent upwards so as to bypass the second shaft 11, and both sides of the pin 25 which slides within the elongated hole 5*d* are supported.

Although the present invention has been described in terms of embodiments which are considered the most practical and favorable at the present point of time, the present invention is not restricted to the embodiments disclosed in this specification but may be modified within a range that does not conflict with the spirit or philosophy of the invention, which can be interpreted read from the scope of claims and from the entire specification. It should be understood that a bar steel cutting tool including such a modification is included in the technical scope of the present invention.

The invention claimed is:

1. A bar steel cutting tool in which a fixed blade body and a rotary blade body that is capable of rotating around a first shaft, by operating a handle in a condition in which the fixed blade body and the rotary blade body are fitted to each other, are provided at a front end of a tool base for shearing bar steel by means of concave blades formed on outer peripheries of the fixed blade body and the rotary blade body, wherein the handle is constructed in such a way that a front end of a proximal portion of the handle is supported by a second shaft that it is located at a position above the tool base, and that is equipped with an elongated hole that extends obliquely in a backward direction from the second shaft, and the rotary blade body forms branch portions which squeeze both the right and left sides of the proximal portion of the handle at a rear end of an arm portion that extends in a backward direction, and the branch portions are bent upwards so as to bypass the second shaft, and so as to support both sides of a pin which slides within the elongated hole.

2. The bar steel cutting tool according to claim 1 wherein the branch portions of the rotary blade body are constituted of two plates.

3. The bar steel cutting tool according to claim 1 wherein the branch portions of the rotary blade body are constituted integrally with the rotary blade body.

4. The bar steel cutting tool according to claim 1 wherein a central plane of the arm portion of the rotary blade body is located on an identical vertical plane as a contact face between the fixed blade body and the rotary blade body.

* * * * *